Patented July 4, 1933

1,916,468

UNITED STATES PATENT OFFICE

ALBERT A. EPSTEIN, OF NEW YORK, N. Y., ASSIGNOR TO CONSOLIDATED PATENTEES CORPORATION, OF NEW YORK, N. Y., A CORPORATION OF NEW YORK

TEA EXTRACT PASTE

No Drawing.   Application filed February 4, 1931. Serial No. 513,356.

My invention relates generally to a tea extract and more particularly to an extract in paste form which will contain without alteration or loss the desirable soluble principles of tea leaves as directly removed from the plant.

Broadly stated my invention relates to the preparation of a tea extract in paste form of a nature that waste in material and loss of flavor is eliminated, accomplishing this desired objective by approximately removing all the aromatic and essential oils of tea leaves by the subjection of the tea leaves directly to the action of an alkaline substance in a water vehicle, which after complete chemical reaction is subjected to concentration and finally mixed with a fluid vehicle to give paste consistency to the tea extract.

The primary object of my invention is the extraction in an economical manner, of the volatile principles of tea leaves by the use of a relatively cheap alkaline substance such as calcium hydrate, mixing the extractive principles with a fluid vehicle to form a paste of the desired consistency.

An object of the invention is the production of a tea paste, preperation and method of manufacturing the same whereby considerable saving can be accomplished in the marketing of tea.

Another object of the invention is the use of a relatively inexpensive alkaline substance that will not only have a reaction with the aromatic oils of the tea leaves to extract the same but will have a destroying action upon the cellulose structure of the tea leaves to enable a more effective reaction between the aromatic oils and the alkaline substance and between the alkaline substance and the tannin of the tea leaves for the separation thereof.

Another object of the invention is the obtainment of a tea extract paste containing all of the soluble principles of the tea leaves such as the essential oils and caffeine.

A further object of the invention is the use of an extracting medium that will have a chemical reaction on tannin as well as the essential oils and caffeine of the tea leaves, the substance precipitating the tannin and forming a solution of the essential oils and caffeine.

A further object of the invention is the preparation of tea extract in paste form which will not deteriorate with age and will hold the aromatic and volatile principles of the tea against dissipation.

A feature of my invention resides in the utilization of a cold extracting treatment in counter distinction to a hot extractive method, the latter being wasteful due to the partial volatilization of the soluble principles of the tea leaves.

Another feature of my invention resides in the development of a new article of manufacture consisting of a tea extract in paste form put up in collapsible tubes whereby the paste will be hermetically sealed under all conditions but capable of being dispensed in any desired quantity to enable the user to prepare a cup of tea of any desired strength.

Besides the above my invention is distinguished in the nature of the ingredients and the quantities thereof used in the manufacture of the paste so as to give the proper consistency to the paste and its instant dissolving in a cup of hot water.

With these and other objects in view my invention will be better understood from the following detailed description setting forth one form of my invention, it being readily understood to those skilled in the art that my invention may be modified in various ways to meet the demands of the trade.

As is well known the principal constituents of tea are caffeine, tannin and essential oil on which depends respectively the physiological effects, the strength and flavor. The commercial value appears to depend on the essential oil and aromatics and not on the amount of caffeine and tannin, the latter having certain undesirable properties.

As tea leaves taken from the plant have a complicated cellulose structure it is very important that this cellulose structure be broken down if the maximum amount of the essential oil and other active principles be brought directly into reactive contact with the extracting medium. It is also a well known fact that solvents and other extractive mediums heretofore utilized will dissolve all aromatic constituents of the tea leaves but not the tannins thereby requiring two separate and distinct processes that involve additional expenses and results in the production of an inferior product. I take advantage of these peculiarities of the tea leaves in the use of an alkaline substance that will facilitate breaking down of the cellulose structure of the tea leaves by bringing the alkaline substance directly in contact with the essential oils, caffeine and tannin which results in the extraction of the essential oils and caffeine in solution and the precipitation of the tannin, accomplishing those desired objectives at a minimum expense.

In accomplishing the foregoing results the tea leaves as taken from the plant are directly placed in a sealed container supporting a quantity of water having in suspension the required alkaline substance. The mixture is properly agitated over a predetermined period for the obtainment of the desired extractive fluid which is subjected to desiccation and the residue mixed with an edible fluid vehicle of the proper consistency to produce a paste.

As a specific example of the product and its method of preparation for accomplishing the desired objective just set forth, I cite the following:

A quantity of tea leaves is submerged in two to four volumes of cold water in a sealed container. A quantity of powdered dry calcium hydrate, approximately 3 to 5% of the quantity of tea leaves is added to the water and the complete mixture is subjected to agitation through the manipulation of the container. I have found that desired results can be accomplished by agitating the mixture for about a half hour. After this period the extract is decanted or filtered off through a cloth or fine mesh and the complete residue is returned to the container for a second extracting which may be repeated as often as desired. The various extractives from the various extractive operations are mixed together and subjected to desiccation by a process known as spray drying. The concentrate is then mixed with 50% solution of glycerine and water to produce a relatively thick paste, packed in hermetically sealed containers, preferably collapsible tubes so that the paste may be positively sealed and measured quantities thereof readily dispensed. Of course, it is to be understood that the extractives obtained from each operation may be subjected to a solvent to remove the caffeine, thereby enabling me to produce a tea extract paste with or without caffeine whichever is desirable in the trade.

The use of the calcium hydrate or other relatively inexpensive materials enables me to economically produce my tea extract paste, the alkaline substance greatly facilitating the extraction of the active principles of tea leaves and readily combines with free or liberated tannic acid to form calcium tannate which is practically insoluble and therefore may be separated from the extraction to give the finished paste another desired quality.

Through the use of the calcium hydrate in water and repeated extraction operations, I am able to eliminate waste of material and loss of flavor and further accomplish the positive removal of tannates and tannic acid which have a bad taste and act as a stringent and constipation material. My extraction method is such as to remove completely all aromatic and active principles of the tea leaves without loss and enables the by-product to be economically used for other trade requirements.

I am aware of the fact that tea leaves have been subjected to various extractive methods mostly in the presence of heat which has the disadvantage that a considerable portion of the volatile active principles of the tea leaves are lost unless additional expensive steps are taken to collect and condense the vapors.

I am also aware of the fact that various chemicals have been used to bring about an alkaline reaction for the extraction of essential oils, but I am of the opinion that I am the first to subject the tea leaves to a cold treatment in the presence of a relatively inexpensive alkaline substance that will intimately mix with the tea leaves and facilitate the breaking down of the fibrous structure to bring into direct contact the active principles of the tea leaves with the chemical utilized to facilitate the obtainment of the extracts.

I am also of the opinion that I am the first to produce tea extract in paste form of the desired consistency containing only the desirable extracts of the tea leaves, the paste being sealed in collapsible tubes which not only assure the hermetical sealing of the paste but enables ejection of the paste in measured quantities, thereby giving the user an opportunity to prepare a cup of tea of the desired strength to meet his individual desires.

Due to the fact that glycerine has excellent solvent properties the use thereof in forming the paste is duofold, first, accomplishing a more intimate mixture between the tea extract and the glycerine and, secondly, preserving the extract in a semi-fluid form, the glycerine readily mixing with hot water thereby liberating the tea extract for instant mixture with the hot water.

I have discovered that various other materials may be substituted for the calcium hydrate such as magnesium, soda, borax and potash, but I have found from actual experience that calcium hydrate is the best not only because of its effective reaction with the body structure of the tea parts but because of its cheapness and non-injurious effect upon the user of the tea paste. I have also discovered that various other vehicles may be substituted for glycerine such as gelatin, edible syrups and equivalents.

In concluding I wish to stress the fact that with my tea extract in paste form I can accomplish a revolutionary change in the manufacture and sale and distribution of tea due to the fact that the paste may be manufactured at a point of growth of the tea leaves. It is a well known fact that tea is a bulk material, as only the soluble portions thereof are utilized by the consumer and if these usable portions can be concentrated without deterioration or loss it can be readily appreciated that considerable saving be accomplished in the shipping of tea to points of distribution.

The fibrous structure of the tea leaves can be accumulated at the point of growth and used to advantage as a by-product.

Due to the fact that my tea extract is in paste form and may be hermetically sealed in collapsible tubes, it will be appreciated that it may be shipped to any point of distribution and will be kept in perfect condition over relatively long extended periods.

Of course, it is to be understood that my invention may be modified in various ways and therefore I do not desire to be limited in protection in any manner whatsoever except as set forth in the following claim.

What I claim is:

A method for preparing a tea extract paste which consists in, first, gathering a predetermined quantity of tea leaves, second, mixing calcium hydrate with cold water, third, mixing the tea leaves with the cold water, fourth, agitating the mixture, fifth, decanting the extracted solution, sixth, concentrating the residue and seventh, mixing the residue with a fluid to form a paste.

In witness whereof I have hereunto set my hand.

ALBERT A. EPSTEIN.